United States Patent [19]

Jaeger

[11] Patent Number: 4,505,300
[45] Date of Patent: Mar. 19, 1985

[54] CONTROL VALVE APPARATUS
[75] Inventor: Thomas S. Jaeger, Crystal, Minn.
[73] Assignee: Honeywell Inc., Minneapolis, Minn.
[21] Appl. No.: 510,032
[22] Filed: Jul. 1, 1983
[51] Int. Cl.³ ............................................. F16K 31/02
[52] U.S. Cl. ........................... 137/614.14; 137/614.18;
 251/139; 251/141
[58] Field of Search ....................... 251/137, 139, 141;
 137/614.11, 614.12, 614.13, 614.14, 614.18

[56] References Cited
U.S. PATENT DOCUMENTS

| 1,028,657 | 6/1912 | Aubert et al. | 251/137 |
| 2,267,515 | 12/1941 | Wilcox et al. | 251/139 |
| 2,279,243 | 4/1942 | Parsons | 251/139 |
| 2,607,368 | 8/1952 | Mayer | 251/139 |
| 3,007,672 | 11/1961 | Tischler | 251/139 |
| 3,125,321 | 3/1964 | Domelen | 251/139 |
| 3,203,447 | 8/1965 | Bremner et al. | 137/595 |
| 3,383,084 | 5/1968 | Mayfield | 251/139 |
| 4,005,733 | 2/1977 | Riddel | 251/141 |
| 4,076,045 | 2/1978 | Nakajima et al. | 251/139 |
| 4,102,526 | 7/1978 | Hargraves | 251/139 |
| 4,322,057 | 3/1982 | Yamanaka et al. | 251/141 |
| 4,326,696 | 4/1982 | Ishikawa et al. | 251/141 |
| 4,336,896 | 6/1982 | Lunau | 251/141 |
| 4,337,794 | 7/1982 | Yamanaka et al. | 251/139 |

FOREIGN PATENT DOCUMENTS

| 2410767 | 9/1975 | Fed. Rep. of Germany | 251/139 |
| 442637 | 6/1912 | France | 251/137 |

Primary Examiner—A. Michael Chambers
Attorney, Agent, or Firm—Clyde C. Blinn

[57] ABSTRACT

A control valve apparatus has an in line ON/OFF valve and an ON/OFF and modulating valve made by placing actuator members in a non-magnetic material tube and surrounding the tube with electromagnetic coils and an iron casing. Openings at each end provide for connections to a gas supply and an outlet for an appliance.

3 Claims, 4 Drawing Figures

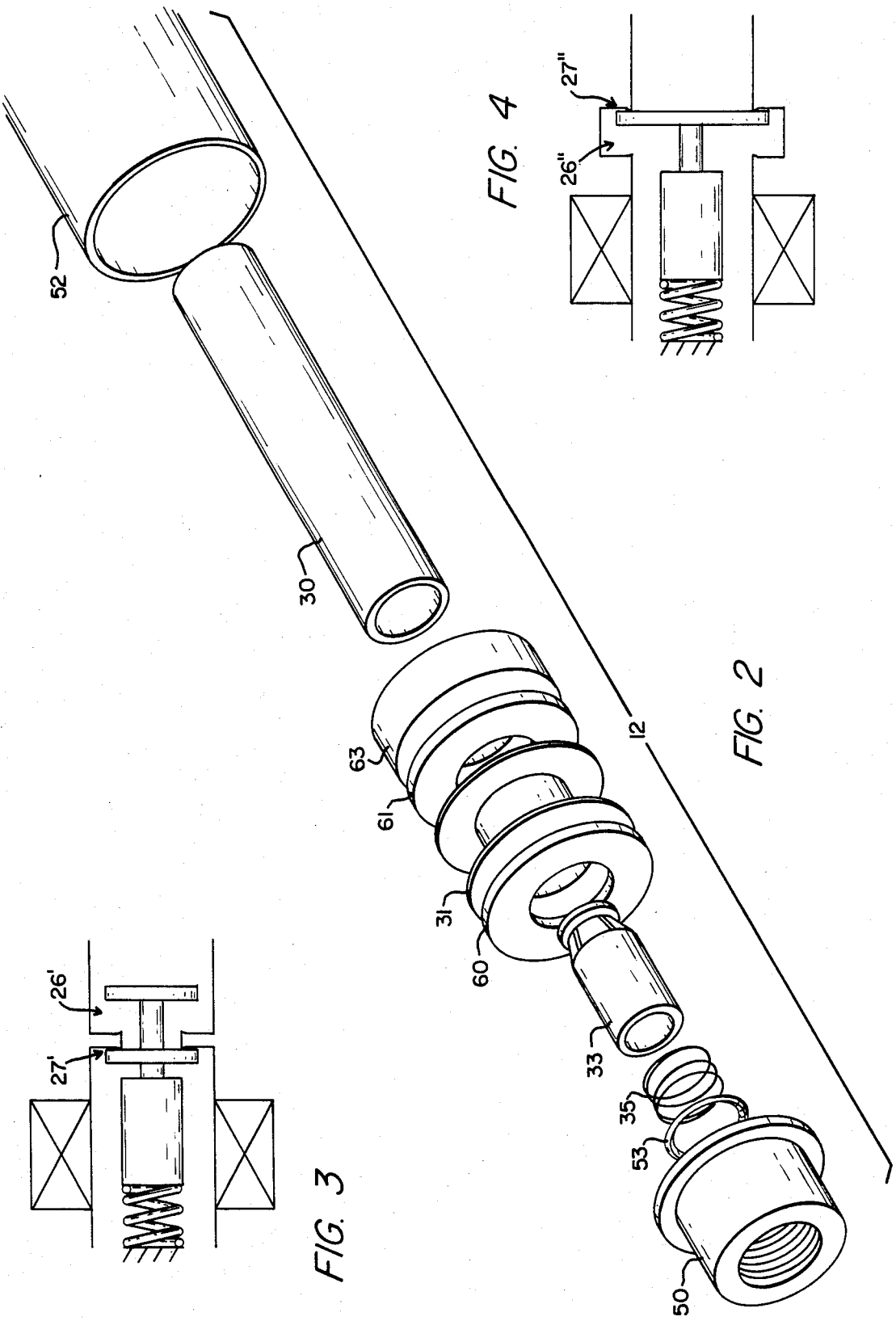

CONTROL VALVE APPARATUS

BACKGROUND AND SUMMARY OF THE INVENTION

With the advent of induced draft combustion apparatus for furnaces and the increased cost of fuel, in particular natural gas, continued research and development is being made to provide improved control systems and components. Such a system is shown in a copending application by the same inventor, Thomas S. Jaeger, entitled CONTROL SYSTEM FOR CONTROLLING THE FUEL/AIR RATIO OF COMBUSTION APPARATUS, Ser. No. 509,833, now U.S. Pat. No. 4,468,192 issued Aug. 28, 1984, filed July 1, 1983.

The present invention is concerned with an improved valve means or apparatus for controlling the gas or fuel flow to a combustion apparatus or furnace. Specifically, the valve means has an ON/OFF valve and a modulating valve connected in series in a pipe configuration. The valve apparatus has a minimum number of parts and sealing gaskets and is readily connected to a source of gas and an appliance or furnace to which gas is to be controlled.

BRIEF DESCRIPTION OF THE DRAWINGS

In the accompanying drawings, forming a material part of this disclosure:

FIG. 2 is a perspective expanded view of the valve of FIG. 1, and

FIGS. 3 and 4 are other embodiments.

DESCRIPTION OF THE INVENTION

Figure 1:
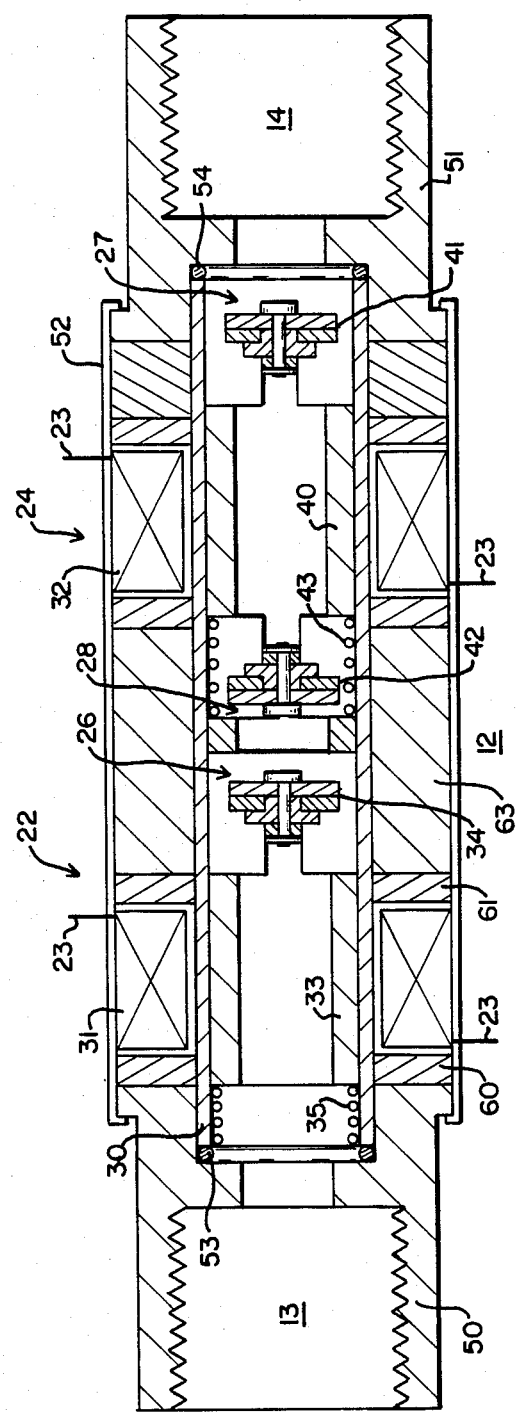
FIG. 1 is a schematic representation of the valve.

Referring to FIG. 1, valve apparatus or valve 12 has a first valve 22 for providing an ON/OFF operation when controlled over a circuit 23 and a second valve 24 for providing an ON/OFF and modulating operation for controlling the flow of fuel or gas depending upon a signal over circuit 25. Valve 22 opens wide open at 26 upon the presence of a signal. Valve 24 moves to open one side at 27 and then vary the size opening at 28 depending on the amount of current or power to circuit 25. Valve apparatus 12 has two ON/OFF valves at 26 and 27 for redundant operation and a modulating valve at 28 for varying or modulation of the gas flow from a supply at 15 to an outlet at 14.

More specifically, referring to FIG. 1, the valve apparatus has a non-ferrous or aluminum tube or valve casing 30 which is surrounded by at least two coils of wire or bobbins 31 and 32 connected to electrical circuits 23 and 25, respectively. Contained in the aluminum tube is a first ferrous or magnetic material slider or valve operator 32 which is connected to valve member or valve disc 34 cooperating with a valve seat or seating surface. Upon the energization of coil 31, member 32 is pulled to the left compressing a bias spring 35 to open the valve opening at 26. A second ferrous slider or valve operator 40 contained in tube 30 is associated with coil 32. Slider 40 is normally biased to the right so that valve member 41 is closed to close the valve opening at 27 and valve member 42 is to the right to open valve opening at 28. Upon energization of coil 32 slider 40 is moved to the left against spring 43 to open valve 27 and move valve member 42 toward its seat so that the valve opening at 28 varies with the current or power in the energization of coil 32. While valve member 42 is shown in one embodiment, various types of shapes might be used to make the valve more readily to vary the flow of gas from the source 13 through the valve to the outlet 14. Such an embodiment might be a tapered member 42 which would be inserted in the seat and vary the gas flow opening depending upon how far the tapered member is moved in the seat.

Other embodiments are shown in FIGS. 3 and 4. The embodiment of FIG. 3 has two valve members cooperating with each side of a seating surface, one 27' for ON/OFF and the other 26' for modulation. FIG. 4 has a single valve member cooperating with two seating surfaces, one 27" for ON/OFF and one 26" for modulation.

The valve apparatus 12 has end pipe connectors 50 and 51 at the inlet and outlet, respectively, which are held in place by an outer ferrous casing or metal shell 52 which may be attached to the pipe connectors in some type of rolling or sealing connection method. When the valve is assembled with the pipe connectors in place, an O-ring 53 and 54 is placed between the end of the aluminum tube 30 and the pipe connectors 50 and 51 as a seal. When the valve apparatus 12 is used for controlling the gas flow from source 13 to the outlet 14, no gas leaks through the casing or between the casing and the pipe connectors exist.

Referring to FIG. 2, an expanded perspective view of the valve apparatus 12 is shown without the valve seating members in any particular detail. Ferrous material flux washers 60 and 61 on each side of the bobbin provide for the magnetic path which is completed by the steel casing 52 or shell and the steel slider or valve operator to move the operator in the position previously mentioned to open the valve when the coils are energized. Spacer 63 separates the two coils which each have their sets of two flux washers.

OPERATION OF THE INVENTION

By the energization of the coil 31 to circuit 23, a magnetic field is established to cause slider or valve operator 32 to move against spring 35 to open the valve at 26 in the position shown to provide for an ON/OFF control of the gas from the source 13. Upon the energization of coil 32 by a varying amount of current depending upon a conventional controller through circuit 25, member 40 is moved to the left as shown to open the valve at 27 to move the member 42 with respect to the seat by a varying amount to modulate the flow of gas through the valve at 28.

The manufacture of such a valve is readily accomplished by the insertion of the sliders or movable valve members into the aluminum tube and the placement of the coils and flux washers and spacer on the outside of the aluminum tube before the steel casing or shell is rolled or attached in some manner to the pipe connectors at each end. A compact and yet functional valve apparatus for use to control gas to a heating apparatus or furnace in a redundant ON/OFF and modulating manner is provided by this invention.

The embodiment of the invention in which an exclusive property or right is claimed are defined as follows:

1. Valve apparatus comprising
   a non-ferrous tube open at both ends,
   at least one wire coil surrounding said tube,
   a pair of ferrous metal washers mounted on each side of said coil,
   a valve member contained in said tube, guided thereby, and spring biased in one direction in the direction of gas flow against a first valve seating surface, second seating surface operatively associated with said valve member upstream of said first valve seating surface, a ferrous metal sleeve surrounding said coil and washers to complete a magnetic path including said valve member and said washers whereby upon energization of said coil said valve member is moved away from said first seating surface against said bias spring to open the valve, a pair of end connector members adapted for connection to pipes, and means including said sleeve for connecting said end members to said tube whereby one of said end connecting members is adapted to be connected to a source of gas under pressure, said valve member is normally spring biased against said first seating surface to provide a normally closed ON/OFF valve and when said coil is energized said second seating surface provides a modulating valve by moving said valve member toward said second seating surface depending upon the amount of energization of said coil, the spring compression pressure and the gas flow pressure.

2. The invention of claim 1 wherein said valve member comprises valve disc cooperating with two seating surfaces, one seating surface for ON/OFF operation and another seating surface for modulating operation.

3. The invention of claim 1 wherein said valve member comprises two valve discs cooperating on opposite sides of a seating surface, one for ON/OFF operation and the other for modulating operation.

* * * * *